T. ERICKSON.
WEED CUTTING ATTACHMENT FOR CULTIVATORS.
APPLICATION FILED JAN. 22, 1919.

1,319,382.  Patented Oct. 21, 1919.

Theodore Erickson
INVENTOR.
BY J. M. Thomas
ATTORNEY

UNITED STATES PATENT OFFICE.

THEODORE ERICKSON, OF MIDVALE, UTAH.

WEED-CUTTING ATTACHMENT FOR CULTIVATORS.

1,319,382.      Specification of Letters Patent.      Patented Oct. 21, 1919.

Application filed January 22, 1919. Serial No. 272,586.

*To all whom it may concern:*

Be it known that I, THEODORE ERICKSON, a citizen of the United States, residing at Midvale, in the county of Salt Lake and State of Utah, have invented certain new and useful Improvements in Weed-Cutting Attachments for Cultivators, of which the following is a specification.

My invention relates to agricultural implements, and has for its object to provide a weeder attachment for use on a cultivator by means of which small plants such as beets and beans may be cultivated close to the row of plants without injuring the small plants by trash, weeds or other debris catching on the weed cutter.

These objects I accomplish with the device illustrated in the accompanying drawings in which similar letters and numerals of reference indicate like parts throughout the several figures and as described in the specification forming a part of this application and pointed out in the appended claims.

Figure 1:
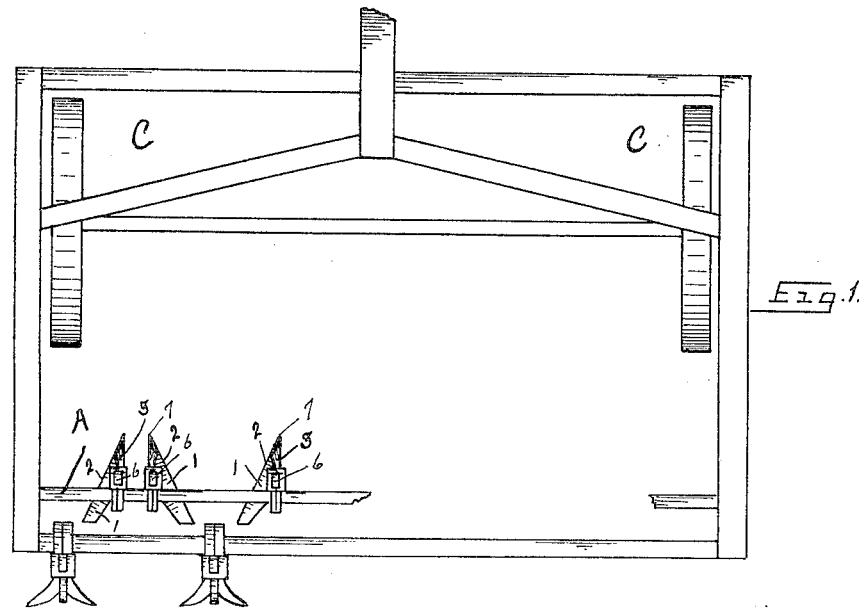
Figures 2, 3, 4:
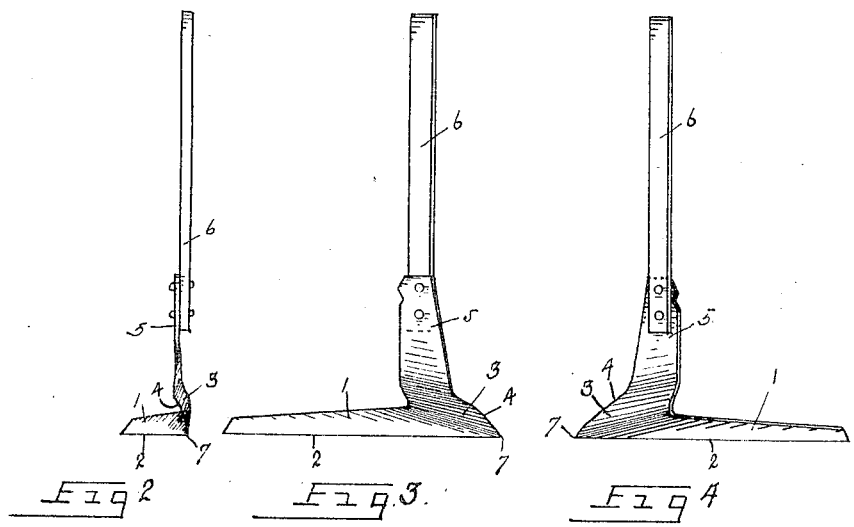

In the drawings in which I have shown a substantial embodiment of my invention, Figure 1 is a plan view of the frame portion of a cultivator with three of my attachments shown as secured thereon. Fig. 2 is a front elevation of the device. Fig. 3 is an elevation of the device looking toward the cutting edge. Fig. 4 is an elevation of the other side of the device.

In the use of weeder attachments for cultivators in the cultivation of small plants such as beets and beans I have found it desirable to cut the weeds and stir the soil close to the row of small plants and in using the attachments provided on cultivators now in use, that weeds, trash and other debris will accumulate on the weed cutting blades and frequently injure every plant in the row for several yards, also that the weed cutting blades now in use cannot be operated close enough to the row of small plants to destroy the weeds particularly harmful to plants while young.

The present invention overcomes such difficulties by providing a weed cutting blade which may be fastened on the cross bar A of the cultivator C in pairs or singly as desired, which weed cutting and soil stirring attachment consists of one portion shown at 1 having one edge 2 thinned and sharpened to cut the weeds and soil. The attachment is to be carried on the frame of the cultivator in such position that the said cutting edge 2 is horizontal and diverges at an angle of about fifteen degrees from the travel line of the cultivator while the other portions of said blade 1 incline upwardly toward the rear and the under side of said blade 1 does not touch the soil except at the said edge 2. Another portion of said attachment consists of the curved upwardly extended integral blade 3, the forward edge of which is thinned and sharpened as at 4. The said sharpened edges 2 and 4 come together at a point 7, which is on the horizontal plane of said edge 2, and in that way prevent any accumulation of weeds or trash thereon to injure the small plants. The blades 1 and 3 are inclined upwardly and rearwardly and form a junction line inclined from the horizontal plane of said cutting edge 2 in order that only the point of said blades shown at 7 touch the soil near the row of plants. Another portion of said blade is extended upwardly as at 5 and the attaching bar 6 is secured thereto by bolts or rivets. The devices are preferably made with the said cutting edge 2 diverging to the right on some and to the left in others and they are detachably secured on the cultivator C in pairs with the said junction lines of the blades 1 and 3 spaced apart and parallel with each other and the line of travel of the cultivator. The cultivator is to be drawn along and over the rows of plants with a right hand blade on one side and a left hand blade on the other side of each row of plants to be cultivated.

Having thus described my invention and its use I desire to secure by Letters Patent and claim:—

1. A beet weeding attachment for cultivators comprising a horizontally disposed cutting blade with the cutting edge set at an angle to the travel of the cultivator; an integral portion of said blade curved vertically upward in line with the travel of the cultivator and having its front portion thinned and sharpened; a vertical bar secured to said last mentioned blade holding the cutting edge of the first blade in a horizontal plane and the junction line between the first and last described blades at an incline with its front end in the same horizontal plane as the cutting edge of the first described cutting blade.

2. An attachment for cultivators consisting of a steel blade having one edge thinned and sharpened; another blade integral therewith bent and curved upwardly and then vertically upward; a cutting edge formed on the second described blade meeting the cutting edge of the first described blade at a point on the same horizontal plane of the cutting edge of the first mentioned blade; and a standard riveted thereon to be detachably secured to the cultivator.

3. In a cultivator attachment for cutting weeds a pair of spaced apart coacting members one held at an acute angle to left and the other at a similar angle to the right of the line of travel, each consisting of a blade with its cutting edge set on the same horizontal plane; another blade integral therewith curved vertically upright and having its front edge thinned and sharpened and meeting the cutting edge of the first described blade at said horizontal plane, with means to hold and secure said blades on a wheeled cultivator.

In testimony whereof I have affixed my signature.

THEODORE ERICKSON

Copies of this patent may be obtained for five cents each, by addressing the "Commissioner of Patents, Washington, D. C."